Patented Sept. 18, 1934

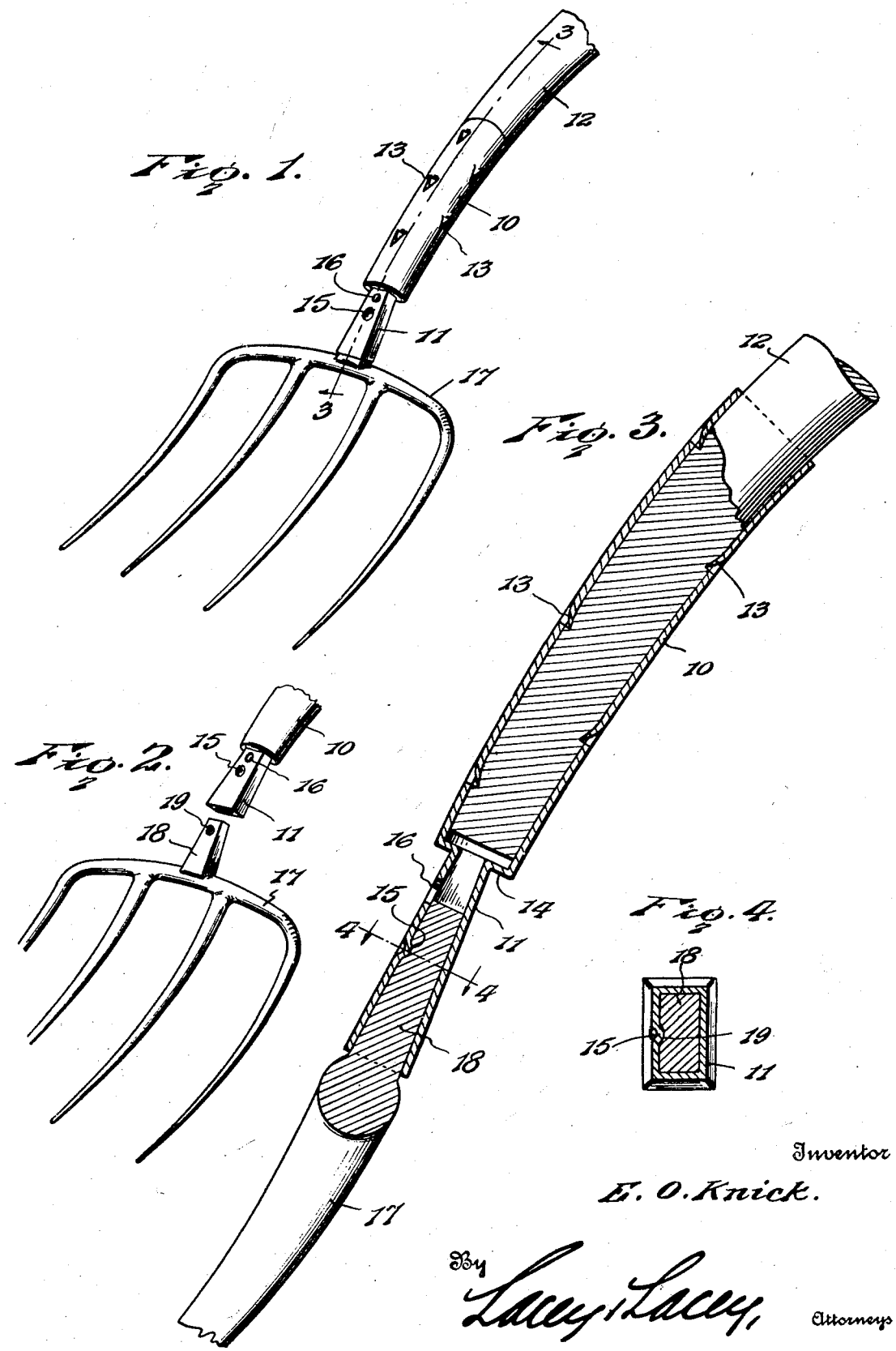

1,974,027

UNITED STATES PATENT OFFICE 1,974,027

FARM IMPLEMENT

Earnest O. Knick, Iowa City, Iowa

Application January 24, 1933, Serial No. 653,305

1 Claim. (Cl. 306—22)

This invention relates to improvements in farm implements and other tools and seeks, among other objects, to provide means whereby, should it become necessary or desirable, the handle of the implement may be readily detached from the body thereof.

A further object of the invention is to provide a construction wherein different tool heads may be selectively used in conjunction with the same handle and wherein, should the handle become broken, said handle may be readily removed.

And the invention seeks, as a still further object, to provide a construction wherein the handle socket of the device will be so formed that the handle will not be weakened at its point of connection with the socket so that liability of breakage of the handle which might otherwise ensue for such reason, will be avoided.

Other and incidental objects of the invention, not specifically mentioned in the foregoing, will be apparent during the course of the following description.

In the accompanying drawing,

Figure 1 is a perspective view showing a pitch fork embodying the invention,

Fig. 2 is a fragmentary perspective view showing the fork head detached from the handle, Fig. 3 is an enlarged sectional view particularly showing the double-ended socket employed, and Fig. 4 is a transverse sectional view on the line 4—4 of Fig. 3.

For convenience, I have shown the present improvements embodied in a pitch fork and will so describe the invention. However, I do not wish to be limited in this respect since, as shall appear in the course of the following description, the invention is equally applicable to other farm implements and various tools.

In carying the invention into effect, I employ a double-ended socket member comprising a handle socket 10 and a tool shank socket 11 integral with the socket 10. The two sockets are preferably pressed from a single piece of suitable resilient sheet metal and, as will be observed, the bottom end of the socket 10 opens into the upper end of the socket 11.

The socket 10 is cylindrical in cross section but is preferably tapered somewhat towards its lower end and, in the present instance, is shown as being curved longitudinally to accommodate the longitudinally curved lower end of a handle 12, which is preferably of wood. The lower end of the handle is shaped to snugly and tightly fit within the socket 10 and struck from the wall of said socket, at suitably spaced points, are inwardly directed spurs 13 which, when the handle is forced into the socket, will yieldably bite into the wood of the handle for firmly connecting the socket unit with the handle.

It is now to be noted that the handle 12 is not pierced by any rivets or other fastening devices such as would weaken the handle adjacent the socket 10 and, accordingly, liability of breakage of the handle from such cause is avoided. However, should the handle become broken, for any reason, a suitable tool may be inserted through the socket 11 to rest against the lower end of the handle when, by driving on said tool, the broken end portion of the handle may be driven from the socket 10. Thus, the handle may be readily removed should occasion demand.

The socket 11 is considerably shorter than the socket 10 and is preferably rectangular in cross section. Furthermore, the socket 11 is, as will be observed, tapered towards its upper end so that a shoulder 14 is thus defined at the junction between said socket and the socket 10. This shoulder will, of course, limit the handle 12 in its downward movement within the socket 10 when the handle is being forced therein. Pressed from the top wall of the socket 11, medially thereof, is an inwardly directed knob or catch 15 and formed in said wall, near the upper end of the socket, is an opening 16.

A fork head is shown at 17. Any approved number of tines may be used and formed on the upper cross bar of the head, medially thereof, is an upstanding shank 18. This shank, like the socket 11, is rectangular in cross section and is tapered towards its upper end, and formed in the front face of the shank, near its upper extremity, is a recess 19.

The shank 18 is of a size to tightly and snugly fit within the socket 11, as best seen in Fig. 3, so that after said shank is driven into the socket it will be securely wedged therein for firmly connecting the fork head with the handle 12 while, due to the rectangular configuration of the socket and shank, turning movement of the fork head relative to the handle will be prevented. As the shank 18 is being driven into the socket 11, the resiliency of the metal will permit the catch 15 to be displaced by the shank until the recess 19 reaches a position registering with said catch, when the catch will spring into said recess for locking the shank against retraction. However, it is to be noted, as particularly seen in Fig. 3, that when the shank is in position within the socket, the upper end of the shank intersects the opening 16. Accordingly, by inserting a suitable tapered tool through said opening to rest against the upper end of the shank and then driving on said tool, the shank may be forced downwardly and thus loosened, when the fork head may be readily removed. I accordingly provide a construction wherein different tools may, if so desired, be readily employed in connection with the same handle.

Having thus described the invention, I claim:

A compound socket comprising a body formed of a single length of resilient material having one end portion formed into a tubular handle receiving socket, the intermediate portion of said body being bent to form an inwardly extending annular shoulder at the lower end of the handle receiving socket and thence continued longitudinally to form a reduced shank receiving socket at the other end portion of the body, there being an inwardly extending catch formed in one wall of the shank receiving socket for seating in a recess formed in the shank of a tool to hold the shank in the socket and spurs extending inwardly from walls of the handle receiving socket for engagement with a handle to hold the handle in the handle receiving socket.

EARNEST O. KNICK. [L. S.]